United States Patent [19]

Brotsky et al.

[11] Patent Number: 4,670,277
[45] Date of Patent: Jun. 2, 1987

[54] INCREASED SHELF-LIFE FOR REFRIGERATED FISH

[75] Inventors: Eugene Brotsky, Pittsburgh; Charles W. Everson, McMurray; William E. Swartz, Upper St. Clair, all of Pa.

[73] Assignee: Stauffer Chemical Company, Westport, Conn.

[21] Appl. No.: 819,438

[22] Filed: Jan. 16, 1986

[51] Int. Cl.$^4$ .......................... A23B 4/02; A23L 3/34
[52] U.S. Cl. .................... 426/310; 426/332; 426/643; 426/652; 426/654
[58] Field of Search .............. 426/332, 335, 643, 654, 426/310, 652

[56] References Cited

U.S. PATENT DOCUMENTS

| | | |
|---|---|---|
| 3,036,923 | 5/1962 | Mahon . |
| 3,462,278 | 8/1969 | Mahon . |
| 3,620,767 | 11/1971 | Swartz . |
| 3,681,091 | 8/1972 | Kohl et al. . |
| 3,875,313 | 4/1975 | Brotsky ........................ 426/265 |
| 4,011,346 | 2/1978 | Ernst ............................ 426/332 |
| 4,040,428 | 8/1962 | Hopkins et al. . |
| 4,075,357 | 2/1978 | Szczesniak et al. ........... 426/332 |
| 4,221,819 | 9/1980 | Falci et al. ................... 526/262 |
| 4,293,578 | 10/1981 | Stone ............................ 426/332 |
| 4,394,396 | 7/1983 | Shimp et al. ................. 426/332 |
| 4,431,679 | 2/1984 | Crawford ..................... 426/332 |
| 4,543,260 | 9/1985 | Brotsky ........................ 426/266 |
| 4,559,234 | 12/1985 | Rubin et al. ............... 426/265 X |

FOREIGN PATENT DOCUMENTS 935413 3/1961 United Kingdom .

Primary Examiner—Robert Yoncoskie
Attorney, Agent, or Firm—Paul J. Juettner

[57] ABSTRACT

Fish fillets can be storage stabilized and yield stabilized by means of a composition containing an alkali metal hexametaphosphate; an alkali metal acid pyrophosphate and an alkali metal sorbate at sorbate levels significantly less than required by prior art and without citric acid.

13 Claims, No Drawings

INCREASED SHELF-LIFE FOR REFRIGERATED FISH

BACKGROUND OF THE INVENTION

Biological spoilage has always been a problem with gathering and transporting food. The gathering of various foods and the actual marketing of the foods may be separated by days or weeks. One of the particularly difficult foods for preservation is fresh fish fillets. Fresh fish is becoming a more popular consumer item. At present, fish are caught in the ocean and iced or immediately frozen for preservation. Upon delivery to retailers, fish shelf-life is extremely short. Not only is there loss due to spoilage but fish lose weight yield due to drip loss. Fresh fish fillets usually maintain a quality shelf-life of only a few days after cut. Methods are needed to extend the shelf-life both for the benefit of the seller and the buyer. Antibiotics such as chlortetracycline have been used to extend the shelf-life of fish fillets but are no longer allowable in the United States. A blend of fumaric acid and benzoate is available but the composition was not particularly effective in a recent study.

The preservation of edible protein as well as yield enhancement is a well studied art which has provided numerous treatment compositions. Each type of protein product, i.e. poultry, fresh meat, eggs, cheese, sausage, shell fish, frozen shrimp and fish, has peculiar biochemical compositions with different types of bacteriological problems, taste problems, and deterioration problems. There are available numerous compositions for increasing preservation and yield which at first blush appear to be similar. However, these compositions are generally useful for only one type of protein. Such compositions are commercially or technically unsuccessful or unacceptable when applied to other types of proteins. The transfer of technology from these areas to fish fillet treatment is seldom possible. For this reason, fish fillets are particularly difficult to preserve and to maintain yield. One of the problems encountered in fish fillet preservation is pH change due to bacterial growth. Since aerobic bacterial growth is prevalent during iced storage, the pH of the fillet tends to rise. This contributes to bacterial growth and flavor problems. A preservative system must counteract both bacterial growth problems and organoleptic problems. A composition for preservation of shell fish is not per se operable with fish fillet. This is particularly true in the case of fresh fish which are not frozen to increase storage stability. Further, food producers, being subject to various labeling and regulatory restrictions as well as customer reaction, desire to avoid any hint of these problems if possible. The more and varied the ingredients in a composition, the greater the risk of encountering a labeling or regulatory problem. A composition with fewer ingredients can provide the food processor with a clearer labeling requirement picture than a composition of many ingredients.

PRIOR ART DESCRIPTION

The problem of increasing the shelf-life of fish fillets has been outlined in a patent to Crawford, U.S. Pat. No. 4,431,679, issued Feb. 14, 1984. This patent teaches that fish fillets can be stabilized by a mixture containing sodium tripolyphosphate (STP), sodium hexametaphosphate, and optionally sodium pyrophosphate in combination with from 0.1 to 0.2 part potassium sorbate per part of phosphates (9–16%) of the total composition and citric acid in an amount sufficient to provide a pH within the range of 5.6–6.5. This product is apparently embodied in a commercial product FISH-PLUS TM fish preservative. It would be desirable to achieve a formulation in which the level of sorbate can be reduced as this material is presently many times as expensive as the next most expensive ingredient, citric acid. It would also be desirable to achieve a formulation which did not contain citric acid as this is also an expensive chemical which can add an undesirable taste to the fish fillet.

Shimp, U.S. Pat. No. 4,394,396, issued July 17 1983. shows a dip used for retaining the natural appearance and preventing weight loss of thawed or cooked shrimp. The dip is composed of an 80:20 to 60:40 ratio of sodium tripolyphosphate to sodium acid pyrophosphate. The pH of the dip is 6.2–7.1. As stated by Crawford, fish fillet are unique from shell fish, and formulations beneficial to one are not necessarily beneficial to the other.

Kohl, U.S. Pat. No. 3,681,091 shows that 1 percent sodium polyphosphate having an average chain length of 18 was effective in preventing propagation of inoculated $S.$ $aureus$ for 3 days in a liquid test media containing ground fish fillet (Example 17). Kohl also discloses blends of polyphosphates having an average chain length of from about 16 to about 100 and an alkali metal sorbate as providing better taste than a preserving amount of sorbate alone (Example 27 ). Kohl discloses that sodium acid pyrophosphate gave no significant microbial growth inhibitory effect when used alone, and a slight inhibitory effect was shown using a 50:50 blend of sodium acid pyrophosphate and tetrasodium pyrophosphate. Kohl does not show the use of a composition of sodium acid pyrophosphate in combination with sodium hexametaphosphate and a sorbate. The preferred levels of sorbate to polyphosphate of 2:1 to 1:2 in Kohl is an undesirably high level of sorbate. Kohl teaches that the presence of pulpy material may contribute to the breakdown of polyphosphate influence over the performance of the additives.

BRIEF DESCRIPTION OF THE PRESENT INVENTION

In accordance with the present invention it has been found that fish fillet can be storage stabilized and yield stabilized without citric acid and the flavor problems attendant with its use by means of a composition containing an alkali metal hexametaphosphate, an alkali metal acid pyrophosphate and a sorbate antimicrobial agent. The detailed amounts and methods of applying the material will become more apparent from the following description.

The compositions of the present invention can stabilize fish fillets at sorbate levels significantly less than required by prior art compositions and without citric acid. The composition of the invention provides effective bacterial, flavor, texture and appearance control at lower cost over that of the compositions of the prior art.

DETAILED DESCRIPTION OF THE PRESENT INVENTION

The alkali metal hexametaphosphate usable in the present invention is a medium chain length polyphosphate of the formula:

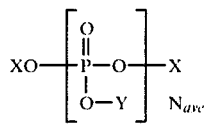

wherein X represents hydrogen or an alkali metal and Y represents an alkali metal, alkali metal being illustrated by potassium and preferably sodium, and $N_{avc}$ represents an average chain length ranging from about 8 to about 100, and preferably from about 8 to about 37, and more preferably from about 8 to about 5. The alkali metal hexametaphosphate is used in an amount ranging from about 75 percent to about 90 percent based on the total dry weight of the composition. The high SHMP content is important to the more efficient shelf-life extension provided by the invention. The high SHMP content in the compositions of the present invention is considered to achieve an efficient synergism with sorbate that STP-sorbate blends cannot achieve.

The composition of the present invention also contains an alkali metal acid pyrophosphate (an acidic compound as distinguished from the alkaline sodium pyrophosphate also known as tetrasodium pyrophosphate). The alkali metal acid pyrophosphate can be illustrated by sodium acid pyrophosphate and potassium acid pyrophosphate or mixtures thereof. preferably, the sodium acid pyrophosphate is used though the potassium can be used if a low sodium diet is needed.

The sodium acid pyrophosphate is used in an amount sufficient to provide a treatment solution having an acid pH sufficient for effective sorbate use and preferably within the range of from about 5.5 to about 6.5. Preferably the pH is adjusted to a level approximately the natural pH of the treated substrate. The alkali metal acid pyrophosphate is preferably used in an amount ranging from about 9 percent to about 11 percent.

Also included in the composition of the invention is a sorbate food grade antimicrobial agent. Included within this class are sorbic acid and alkali metal sorbates such as sodium and, preferably, potassium sorbates and mixtures thereof.

The sorbate antimicrobial agent is used in an amount sufficient with the sodium hexametaphosphate and sodium acid pyrophosphate to extend the shelf-life of the substrate over a control. The preferred sorbate is preferably used in an amount ranging from about 4 to about 8.5 percent based on the weight of the total composition.

The composition of the present invention can be prepared by dry blending the ingredients or by mixing the ingredients and drying them as desired. This dried composition can be stored until such time as needed for use. Also, the composition can be formed in situ in the treatment tank. The treatment solution can contain any other functional or functionally inert ingredients which have no detrimental effect on the functioning of the treatment solution of the invention. Such materials may include water, fats, oils, color, flavoring and the like. The preferred vehicle is water.

The composition of the invention is used in amounts sufficient to provide a solution having a solids content of the phosphate and sorbate composition ranging from 3 to 20 percent and preferably from about 8 to about 12 percent by weight based on the total weight of the solution, e.g. solvent and the phosphate and sorbate ingredients. The solution is in such concentration that the fish will pick up a sufficient amount of solution to provide the level of shelf-life control desired.

The solution can be applied to the surface of the fish fillet by conventional means including spraying, dipping and flooding or to the interior of the fillet by injection with a solution containing an effective amount of the treatment material composition or a combination of injection and surface treatment. The fillets can be flexed in the solution to improve absorption of the treating solution. The solution is applied to the fillet such that an amount effective to preserve and stabilize the fillet is absorbed. Dipping time is sufficient to cause fish take-up of such an effective amount and can be as short as 10 seconds to hours or longer. The time is reduced by flexing the fillet. Exact times may vary depending on the size of the fillet and species of fish. Concentrations and absorbence rates can be adjusted to meet any governmental requirements or limits.

The invention is illustrated in the Examples which follow. As used in the Examples, the sodium hexametaphosphate had an average chain length of phosphate groups of 12. The best raw appearance rank is 1. Flavor and texture were judged on a hedonic scale of 1 to 9 where 9 is the best unless otherwise stated. Throughout the Examples, the compositions denoted SHMP/SAPP/SORB are the same formulations as in Example I. All percentages are by weight unless otherwise stated.

The following compositions will be used in the Examples unless otherwise indicated. The reference to the % sorbate is intended to mean a formulation as outlined in the Table below:

TABLE I

TREATMENT AGENTS USED IN EXPERIMENTS PERCENT TOTAL COMPOSITION

| Sorbate[1] | SHMP[2] | SAPP[3] | STP[4] | Citric Acid | pH (1% Sol'n) |
|---|---|---|---|---|---|
| 4.3 | 85.5 | 10.2 | — | — | 6.1 |
| 6.3 | 83.7 | 10 | — | — | 6.2 |
| 8.2 | 82 | 9.8 | — | — | 6.3 |
| 11.4 | 79.1 | 9.5 | — | — | 6.5 |
| *9.9 | 15.7 | — | 62.6 | 11.8 | 6.6 |
| **12.7 | — | — | 77.0 | 10.3 | 7.0 |

[1]Sorbate is Potassium Sorbate.
[2]SHMP is Sodium Hexametaphosphate, glassy polyphosphate, average chain length of 12.
[3]SAPP is Sodium Acid Pyrophosphate.
[4]STP is Sodium Tripolyphosphate.
*Example of P.N. 4,431,679 with 1.6% less sorbate, the other values being modified to equal 100%.
**FISH-PLUS ™, fish preservative composition, per analysis.

In these Examples, taste test panel results were conducted on samples which were battered with a commercial mix (MODERN MAID All Purpose Batter) and breaded with a commercial breading mix (REDI-BREADER). The breaded fillets were fried at 176.7° C. (350° F.) for 3.5 minutes on one side and 2.5 minutes on the other. Corresponding portions of each fillet were evaluated for preference by the tasters.

Tasting was done by company personnel and part-time employees who are students in consumer type testing. Only a relatively small number of tasters was involved (4–8). The confidence limits for the data were not expected to be conclusive.

Standard plate counts were determined by an outside laboratory. One hundred gram fillet samples were blended with sterile water and 10 gram portions were diluted with phosphate buffer, pH 7.2. Blender jars were sterilized between samples with alcohol. Microbial incubation was conducted at 32° C. for 48 hours using AOAC techniques. Plate counts were reported as the numerical values or as logarithms in the Tables.

EXAMPLE 1

Whole catfish were purchased and filleted locally. The fillets were preweighed. Treating compositions were prepared by dry blending the ingredients as set forth in TABLE II and were dissolved at a 10 percent concentration. Fillets were flexed with 10 percent of treatment solution, based on the weight of the fillets, for 1 minute each, drained and weighed. Flexing was accomplished by forcing each side of the fillets to follow the contours of a bowl containing the treating solution. The fillets were placed in tightly closed polyethylene bags and stored on ice in an insulated box in a 3.3° C. room. The controls were placed in bags after treatment with water only. The samples were evaluated for yield, odor, appearance and flavor as well as bacterial count.

TABLE II
EVALUATION OF CATFISH FILLETS STORED ON ICE

| Treatment | % Sorb In Comp. | % Yield[1] Treatment | % Yield[1] Storage | Taste Panel[2] Flv. | Taste Panel[2] Tex. | Taste Panel[2] Odor |
|---|---|---|---|---|---|---|
| Control | — | 104.3 | 97.8 | 2.5 | 3.8 | 2.2 |
| SHMP/SAPP | 0 | 106.1 | 101.8 | 4.3 | 5.1 | 4.0 |
| SHMP/SAPP/SORB | 4.3 | 105.9 | 102.9 | 4.7 | 5.7 | 5.2 |
| SHMP/SAPP/SORB | 8.2 | 105.2 | 102.5 | 4.4 | 5.9 | 4.4 |
| SHMP/SAPP/SORB | 11.4 | 105.8 | 103.8 | 6.0 | 6.7 | 5.8 |
| FISH-PLUS TM | 12.7 | 106.6 | 103.8 | 6.0 | 5.6 | 3.6 |

| Treatment | % Sorb in Comp. | Std. Plate Count (Log) Day 1 | Std. Plate Count (Log) Day 5 | Std. Plate Count (Log) Day 9 |
|---|---|---|---|---|
| Control | — | 6.60 | 7.86 | 8.04 |
| SHMP/SAPP | 0 | 5.89 | 7.38 | 7.95 |
| SHMP/SAPP/SORB | 4.3 | 5.78 | 6.04 | 7.56 |
| SHMP/SAPP/SORB | 8.2 | 5.56 | 5.78 | 7.62 |
| SHMP/SAPP/SORB | 11.4 | 5.88 | 5.95 | 6.90 |
| FISH-PLUS TM | 12.7 | 6.81 | 6.78 | 7.78 |

[1]Raw fillets were drained and weighed. Percent yields are based on initial weight as 100%. Treatment yields are an average of 6 samples, storage yields are an average of 2 samples.
[2]1-9 hedonic scale where 9 is highest preference. Panel was run after 13 days storage.

The data in TABLE II shows that after 5 days storage sorbate levels of 4.3 percent or greater provided appreciable microbial inhibition compared to the water control and a treating solution of SHMP/SAPP containing no sorbate. Odor ratings were also improved using sorbate, particularly in the compositions of the invention as compared to the commercial composition. After 13 days, those samples having 11.4 percent and 12.7 percent sorbate showed the most accepted flavor. Flavor results to determine acceptability of the treatment at lower sorbate levels for shorter storage periods of time were not obtained. The microbial data suggest that lower sorbate lewels can be used in the compositions of the invention to significantly inhibit deterioration.

EXAMPLE 2

Flounder were treated in this Example using the same agents as in Example 1 . The agents containing different sorbate levels again inhibited microbial growth compared to water control (TABLE III) but not compared to SHMP/SAPP without sorbate. The taste panel results in TABLE IV showed significant improvement over the control over time by the inclusion of even low levels of sorbate with the phosphate. The SHMP/SAPP blend containing 4.3 percent sorbate provided good organoleptic ratings through 9 days storage and ratings which were nearly as high as the commercial product containing 12.7 percent sorbate. This result is surprising since the patent relating to the commercial product (U.S. Pat. No. 4,431,679) specifies that a minimum of 9.1 percent sorbate is required for significant shelf-life extension in a blend containing STP, SHMP, citric acid and sorbate.

TABLE III
FLOUNDER YIELDS AND MICROBIAL COUNTS

| Treatment | % Sorb in Comp. | % Yield Treatment | % Yield Storage |
|---|---|---|---|
| Control | — | 101.1 | 97.4 |
| SHMP/SAPP | 0 | 105.8 | 101.7 |
| SHMP/SAPP/SORB | 4.3 | 104.7 | 102.7 |
| SHMP/SAPP/SORB | 8.2 | 104.4 | 100.6 |
| SHMP/SAPP/SORB | 11.4 | 103.1 | 100.8 |
| FISH-PLUS TM | 12.7 | 108.0 | 103.7 |

| Treatment | % Sorb in Comp. | Std. Plate Count (Log) Day 6 | Std. Plate Count (Log) Day 9 | Std. Plate Count (Log) Day 12 |
|---|---|---|---|---|
| Control | — | 6.04 | 7.11 | 7.56 |
| SHMP/SAPP | 0 | 6.08 | 6.62 | 7.30 |
| SHMP/SAPP/SORB | 4.3 | 5.89 | 6.86 | 6.95 |
| SHMP/SAPP/SORB | 8.2 | 5.56 | 6.57 | 7.26 |
| SHMP/SAPP/SORB | 11.4 | 5.81 | 6.04 | 7.48 |
| FISH-PLUS TM | 12.7 | 5.90 | 6.00 | 7.38 |

Percent yields are based on initial weight as 100 percent. Treatment yields are an average of 6 samples, storage yields are an average of 2 samples.

TABLE IV
TASTE PANEL EVALUATION OF FLOUNDER FILLETS

| Treatment | % Sorb in Comp. | Flavor Summary Day 6 | Flavor Summary Day 9 | Flavor Summary Day 12 |
|---|---|---|---|---|
| Control | 0 | 4.4 | 2.6 | 3.0 |
| SHMP/SAPP | 0 | 4.8 | 3.2 | 3.0 |
| SHMP/SAPP/SORB | 4.3 | 7.4 | 5.2 | 3.3 |
| SHMP/SAPP/SORB | 8.2 | 7.8 | 5.2 | 4.8 |
| SHMP/SAPP/SORB | 11.4 | 7.2 | 5.8 | 4.8 |
| FISH-PLUS TM | 12.7 | 5.8 | 5.4 | 3.8 |

| Treatment | % Sorb in Comp. | Texture Summary Day 6 | Texture Summary Day 9 | Texture Summary Day 12 | Odor Summary Day 12 |
|---|---|---|---|---|---|
| Control | 0 | 5.0 | 3.0 | 4.3 | 2.0 |
| SHMP/SAPP | 0 | 6.4 | 2.8 | 4.3 | 2.0 |
| SHMP/SAPP/SORB | 4.3 | 5.6 | 4.6 | 4.3 | 5.0 |
| SHMP/SAPP/SORB | 8.2 | 6.8 | 3.0 | 5.8 | 5.5 |
| SHMP/SAPP/SORB | 11.4 | 6.8 | 4.0 | 5.8 | 5.5 |
| FISH-PLUS TM | 12.7 | 5.8 | 6.2 | 5.5 | 4.5 |

1-9 hedonic scale where 9 is highest preference.

EXAMPLE 3

Ocean catfish and cod were treated with the agents in TABLE I dissolved at 10 percent concentration. The fillets were flexed in treatment solution as in Example 2. One set of each species was injected using a Townsend TM mini-injector.

Fillets were cooked in covered foil pans in a 400° F. oven for 10 minutes. The results of evaluation of the samples are shown in TABLES V and VI:

TABLE V
CATFISH AND COD PROCESSING YIELDS AND MICROBIAL COUNTS

| Treatment | % Sorb in Agent | Type of Treatment | % Pickup | % Yield Storage | % Yield Cooked |
|---|---|---|---|---|---|

TABLE V-continued
CATFISH AND COD PROCESSING YIELDS AND MICROBIAL COUNTS

| Catfish Control | 0 | Flex | 103.4 | 94.3 | 75.1 |
|---|---|---|---|---|---|
| SHMP/SAPP | 0 | Flex | 110.1 | 105.9 | 84.8 |
| SHMP/SAPP/SORB | 4.3 | Flex | 107.5 | 103.6 | 80.6 |
| SHMP/SAPP/SORB | 6.3 | Flex | 106.6 | 104.1 | 82.8 |
| SHMP/SAPP/SORB | 8.2 | Flex | 108.3 | 108.5 | 81.9 |
| P.N. 4,431,679* | 9.9 | Flex | 108.4 | 104.6 | 82.1 |
| SHMP/SAPP/SORB | 11.4 | Flex | 107.3 | 104.9 | 83.9 |
| SHMP/SAPP/SORB | 11.4 | Inject | 110.6 | 109.2 | 85.0 |
| Cod Control | 0 | Flex | 104.5 | 99.0 | 80.5 |
| SHMP/SAPP | 0 | Flex | 107.0 | 108.1 | 94.0 |
| SHMP/SAPP/SORB | 4.3 | Flex | 106.7 | 105.7 | 89.6 |
| SHMP/SAPP/SORB | 6.3 | Flex | 106.2 | 105.5 | 87.5 |
| SHMP/SAPP/SORB | 8.2 | Flex | 106.9 | 105.6 | 84.6 |
| P.N. 4,431,679* | 9.9 | Flex | 107.3 | 105.2 | 83.0 |
| SHMP/SAPP/SORB | 11.4 | Flex | 106.9 | 106.1 | 87.2 |
| SHMP/SAPP/SORB | 11.4 | Inject | — | — | — |

| Treatment | % Sorb in Agent | Std. Plate Count (Log) Day 2 | Day 6 | Day 9 |
|---|---|---|---|---|
| Catfish Control | 0 | 4.38 | 4.50 | 6.48 |
| SHMP/SAPP | 0 | — | 4.30 | 5.32 |
| SHMP/SAPP/SORB | 4.3 | 3.86 | 4.00 | 5.11 |
| SHMP/SAPP/SORB | 6.3 | 3.20 | 3.60 | 5.95 |
| SHMP/SAPP/SORB | 8.2 | 3.78 | 3.70 | 4.90 |
| P.N. 4,431,679* | 9.9 | 3.62 | 4.00 | 5.34 |
| SHMP/SAPP/SORB | 11.4 | 3.56 | 4.11 | 4.85 |
| SHMP/SAPP/SORB | 11.4 | 5.48 | 4.30 | 5.51 |
| Cod Control | 0 | — | 5.26 | 6.68 |
| SHMP/SAPP | 0 | — | 4.23 | 6.00 |
| SHMP/SAPP/SORB | 4.3 | — | 4.34 | 5.11 |
| SHMP/SAPP/SORB | 6.3 | — | 3.70 | 5.72 |
| SHMP/SAPP/SORB | 8.2 | — | 3.30 | 4.90 |
| P.N. 4,431,679* | 9.9 | — | 3.90 | 5.41 |
| SHMP/SAPP/SORB | 11.4 | — | 3.95 | 5.92 |
| SHMP/SAPP/SORB | 11.4 | — | 4.41 | 6.08 |

*See TABLE I

TABLE VI
TASTE PANEL EVALUATION OF CATFISH AND COD STORED ON ICE

| Treatment | % Sorb in Agent | Type of Treatment | Flavor Summary Day 2 | Day 6 | Day 9 |
|---|---|---|---|---|---|
| Catfish Control | 0 | Flex | 2.4 | 2.3 | 3.8 |
| SHMP/SAPP | 0 | Flex | 4.2 | 4.3 | 5.5 |
| SHMP/SAPP/SORB | 4.3 | Flex | 4.8 | 5.0 | 5.3 |
| SHMP/SAPP/SORB | 6.3 | Flex | 5.0 | 4.8 | 5.5 |
| SHMP/SAPP/SORB | 8.2 | Flex | 3.8 | 4.3 | 5.3 |
| P.N. 4,431,679* | 9.9 | Flex | 5.6 | 4.3 | 3.3 |
| SHMP/SAPP/SORB | 11.4 | Flex | 4.0 | 4.0 | 4.5 |
| SHMP/SAPP/SORB | 11.4 | Inject | 5.4 | 5.3 | 5.3 |
| Cod Control | 0 | Flex | 5.8 | 4.2 | 4.0 |
| SHMP/SAPP | 0 | Flex | 5.2 | 3.0 | 4.6 |
| SHMP/SAPP/SORB | 4.3 | Flex | 5.0 | 3.4 | 5.6 |
| SHMP/SAPP/SORB | 6.3 | Flex | 5.6 | 5.6 | 6.2 |
| SHMP/SAPP/SORB | 8.2 | Flex | 6.0 | 5.0 | 5.6 |
| P.N. 4,431,679* | 9.9 | Flex | 5.2 | 5.4 | 6.2 |
| SHMP/SAPP/SORB | 11.4 | Flex | 6.2 | 4.6 | 5.4 |
| SHMP/SAPP/SORB | 11.4 | Inject | 5.8 | 5.0 | 6.0 |

| Treatment | Texture Summary Day 2 | Day 6 | Day 9 | Odor Summary Day 2 | Day 6 | Day 9 |
|---|---|---|---|---|---|---|
| Catfish Control | 4.2 | 3.5 | 5.5 | 5.9 | 5.0 | 4.1 |
| SHMP/SAPP | 4.6 | 4.8 | 6.3 | 5.9 | 5.7 | 5.3 |
| SHMP/SAPP/SORB | 5.2 | 5.0 | 4.8 | 4.9 | 5.7 | 4.9 |
| SHMP/SAPP/SORB | 4.8 | 4.8 | 4.8 | 5.4 | 5.9 | 5.4 |
| SHMP/SAPP/SORB | 2.8 | 4.3 | 5.0 | 5.1 | 5.9 | 5.1 |
| P.N. 4,431,679* | 4.4 | 4.5 | 5.5 | 3.9 | 5.0 | 5.8 |
| SHMP/SAPP/SORB | 5.4 | 5.5 | 5.8 | 5.0 | 5.9 | 5.4 |
| SHMP/SAPP/SORB | 5.8 | 4.3 | 4.3 | 5.4 | 5.6 | 5.1 |

TABLE VI-continued
TASTE PANEL EVALUATION OF CATFISH AND COD STORED ON ICE

| Cod Control | 5.4 | 4.2 | 3.4 | 4.6 | 4.1 | 4.8 |
|---|---|---|---|---|---|---|
| SHMP/SAPP | 4.0 | 3.2 | 4.4 | 5.0 | 5.4 | 5.3 |
| SHMP/SAPP/SORB | 4.2 | 4.0 | 5.0 | 4.7 | 5.4 | 5.3 |
| SHMP/SAPP/SORB | 4.4 | 5.4 | 6.0 | 4.7 | 6.0 | 5.6 |
| SHMP/SAPP/SORB | 6.4 | 3.8 | 5.2 | 5.3 | 5.4 | 5.3 |
| P.N. 4,431,679* | 5.4 | 5.0 | 5.6 | 4.7 | 5.4 | 5.8 |
| SHMP/SAPP/SORB | 6.2 | 4.4 | 5.4 | 5.3 | 4.9 | 5.4 |
| SHMP/SAPP/SORB | 4.4 | 5.0 | 6.0 | 4.3 | 4.0 | 6.0 |

*See TABLE I

The microbial growth data of TABLE V showed all treating agents inhibited growth in the two species compared to their respective water controls. The microbial inhibition data were too variable to significantly indicate differences among sorbate levels.

Catfish exhibited flavor ratings for the SHMP/SAPP/SORB samples that were similar to each other at all storage periods. Samples of U.S. Pat. No. 4,431,679 rated higher at Day 2 and lower at Day 9 than those treated using the treatment agents of the invention. Control samples rated low at all storage times.

Cod ratings did not vary much with treatment on Days 2 and 9. However, on Day 6 the 0 percent and 4.3 percent sorbate levels rated lower. The odor ratings for these samples were similar to those obtained by higher sorbate level sample and were higher than controls for all storage periods.

Overall, the taste panel evaluations for the products of the invention in Example 3 show that SHMP/SAPP containing lower sorbate levels provided flavor, texture and odor ratings similar to U.S. Pat. No. 4,431,679 containing 9.9 percent sorbate and ratings that were higher than controls. Microbial inhibition data show the same results. These results show the same patterns as those in the previous runs and confirm that 4.3 percent—8.2 percent sorbate levels are sufficient for providing 3–6 day shelf-life extension in the present invention, whereas U.S. Pat. No. 4,431,679 requires a minimum of 9.1 percent sorbate for significant shelf-life extension. SHMP/SAPP containing 6.3 percent sorbate is recommended as the preferred composition in the present invention. U.S. Pat. No. 4,431,679 shows a preferred composition for FISH-PLUS ™ which contains 11.5 percent sorbate.

p EXAMPLE 4

A blend of SHMP/SAPP/SORB containing 83.7 percent SHMP, 10 percent SAPP and 6.3 percent sorbate was dissolved in cold water at a 10 percent concentration. Fifty pound batches of 5–8 ounce catfish fillets were pre-weighed and added to a BAADER Batch Treatment Machine (BTM). Treatment solution was added at 7 percent by weight of the fillets and the batch was agitated in the BTM for 1 minute. Controls were agitated with water. Treated fillets were drained, weighed and packaged in 1 pound styrofoam trays. The trays were packed with ice, held either at 37° F., stored on ice or frozen. They were evaluated periodically for weight changes, microbial counts and organoleptic changes.

For tasting, fillets were battered and breaded, fried in 176.7° C. (350° F.) oil for 6 minutes and rated in blind testing.

TABLE VIII

PLANT CATFISH YIELDS AND MICROBIAL COUNTS

| Treatment | % Sorb in Agent | pH | Storage at 0° C. (32° F.) Standard Plate Count (Log) | | | | | % Yield | | Storage at 2.8° C. (37° F.) Standard Plate Count (Log) | | |
|---|---|---|---|---|---|---|---|---|---|---|---|---|
| | | | Day 2 | Day 7 | Day 12 | Day 16 | Day 21 | Treatment[1] | Storage[2] | Day 4 | Day 8 | Day 12 |
| Control | — | — | 6.61 | 8.28 | 7.76 | 8.08 | 10.36 | 102.2 | 98.4 | 5.65 | 8.04 | 7.76 |
| SHMP/SAPP/SORB | 6.3 | 6.51 | 5.15 | 5.28 | 7.76 | 7.94 | 8.76 | 104.5 | 102.0 | 5.32 | 5.04 | 7.76 |

[1]Average of two 50 pound batches.
[2]Average of 8 samples/treatment.

TABLE IX

TASTE PANEL EVALUATION OF PLANT CATFISH[1]

Storage at 0° C. (32° F.)

*Flavor Summary*

| Treatment | Day 2 | Day 7 | Day 12 | Day 16 | Day 21 |
|---|---|---|---|---|---|
| Control | 8.3 | 5.8 | 5.3 | 3.0 | — |
| SHMP/SAPP/SORB | 6.7 | 6.8 | 5.8 | 5.7 | 5.8 |

*Texture Summary*

| Treatment | Day 2 | Day 7 | Day 12 | Day 16 | Day 21 |
|---|---|---|---|---|---|
| Control | 7.7 | 5.8 | 5.9 | 4.7 | — |
| SHMP/SAPP/SORB | 7.3 | 6.5 | 5.7 | 6.3 | 6.3 |

*Odor Summary*

| Treatment | Day 7 | Day 12 | Day 16 | Day 21 |
|---|---|---|---|---|
| Control | 6.0 | 5.5 | 2.3 | 1.3 |
| SHMP/SAPP/SORB | 6.5 | 6.0 | 5.5 | 3.2 |

Storage at 2.8° C. (37° F.)

| | Flavor Summary | | | Texture Summary | | |
|---|---|---|---|---|---|---|
| Treatment | Day 5 | Day 8 | Day 12 | Day 5 | Day 8 | Day 12 |
| Control | 5.0 | 5.0 | 3.3 | 5.4 | 4.6 | 3.6 |
| SHMP/SAPP/SORB | 6.0 | 5.7 | 6.8 | 5.9 | 5.5 | 5.8 |

*Odor Summary*

| Treatment | Day 5 | Day 8 | Day 12 |
|---|---|---|---|
| Control | 5.1 | 2.8 | 1.6 |
| SHMP/SAPP/SORB | 5.4 | 6.1 | 3.8 |

[1]Preference ratings using a 1-9 hedonic scale where 9 is most preferred.

Control sample counts showed generally higher microbial counts over time than sample counts stored at 0° C. (32° F.) and 2.8° C. (37° F.).

Flavor results at 0° C. (32° F.) (TABLE IX) inversely parallel the microbial results. Decreases in flavor ratings with storage time generally correspond to microbial increases with storage time. The blend of the invention maintained acceptable flavors for 21days. whereas control samples became unacceptable (ratings below 5) after 12 days Flavor ratings at 2.8° C. (37° F.) showed similar trends and indicated a shelf-life extension for the invention of about 4 days.

Odor scores for raw samples reflect the flavor scores. Panelists generally rated odor "neither like nor dislike" until near the end of the shelf-life period when some unpleasant odors became apparent. In this regard, an odor rating of "3" corresponded to a flavor rating of "5", and indicated the end of shelf-life.

Overall, the results show that catfish are readily treated with compositions of the invention under plant conditions using a commercially available mechanical unit. The yields and shelf-life extension achieved are consistent with previous studies and indicate that the process is practical and economically attractive for commercial use.

EXAMPLE 5

Whole catfish were processed as in Example 1. Fillets from each fish were distributed among various treatments. Treating compositions as in TABLE X were dissolved at an 8 percent concentration. Four fillets were flexed with 7 percent by weight based on the weight of the fillets of treatment solution. The controls were placed in bags without treatment. The samples were evaluated for odor, appearance and flavor after 5 and 7 days storage.

TABLE X

| | Example | | |
|---|---|---|---|
| | A SHMP/SAPP/SORB | B STP/SAPP/SORB | C PN 4,431,679* |
| SHMP | 79.6 | — | 15.4 |
| SAPP | 8.9 | 44.25 | — |
| SORB | 11.5 | 11.5 | 11.5 |
| STP | — | 44.25 | 61.5 |
| Citric Acid | — | — | 11.6 |
| pH (1% solution) | 6.37 | 6.45 | 6.64 |

*See Example of P.N. 4,431,679

TABLE XI

| | Example | | | |
|---|---|---|---|---|
| | A SHMP/SAPP/SORB | B STP/SAPP/SORB | C PN 4,431,679 | D Control |
| | Raw Appearance Rank[1]/Flavor[2] | | | |
| Day | | | | |
| 5 | 1/6 | 2/16 | 4/16 | 3/18 |
| 7 | 1/8 | 2/5.7 | 4/5.3 | 3/5.3 |
| 9 | 2 | 3 | 3 | 1 |

SHMP/SAPP/SORB scored the highest in raw appearance and in flavor acceptability.
(11% SORB level outside our level)
[1]Rank in order where 1 is best
[2]Day 5 flavor samples were ranked and scores added together. Lowest score is highest acceptability. Day 7 rated on 1-9 hedonic scale where 9 is highest preference.

EXAMPLE 6

Catfish fillets (5 per treatment) were weighed and labeled. The fillets were flexed for 1 minute each with 10 percent by weight of the fillets of treatment solution. The fillets were drained for 30 minutes, reweighed, packaged in tightly sealed polybags and stored over ice in an insulated box in a 3.3° C. room. The amount of solution absorbed was determined based on initial and drained weights; values were reported as percent yield based on the initial weight as 100 percent. Flavor and texture evaluations were conducted after 5 and 8 days. The results are reported in TABLE XII.

TABLE XII

| | Example | | |
|---|---|---|---|
| | A | B | C |
| | SHMP/SAPP/SORB | FISH-PLUS ™ | Control |

TABLE XII-continued

| | Example | | |
|---|---|---|---|
| | A | B | C |
| % Conc. | 8 | 8 | — |

Raw Appearance

| Day | | | |
|---|---|---|---|
| 5 | 1 | 4 | 2 |
| 8 | 2 | 3 | 1 |

% Yield

| Day | | | |
|---|---|---|---|
| 0 | 102.7 | 102.6 | 100.0 |
| 5 | 101.3 | 101.7 | 98.5 |
| 8 | 100.7 | 100.7 | 98.4 |

Standard Plate Count ($\times 10^3$)

| Day | | | |
|---|---|---|---|
| 1 | 170 | 120 | 340 |
| 7 | 910 | 400 | 7,200 |
| 12 | 37,000 | 33,000 | 34,000 |

Taste Panel

| | Flv. | Tex. | Flv. | Tex. | Flv. | Tex. |
|---|---|---|---|---|---|---|
| Day | | | | | | |
| 5 | 5.0 | 6.8 | 6.2 | 7.4 | 4.5 | 6.0 |
| 8 | 6.8 | 6.0 | 6.2 | 5.7 | 4.8 | 5.0 |

SHMP/SAPP/SORB composition provided the best raw appearance. Yields and plate counts are substantially equivalent for the phosphate/sorbate samples and are higher than controls; and 8 day texture/taste panel results are improved for SHMP/SAPP/SORB over FISH-PLUS TM fish preservative in the absence of citric acid.

EXAMPLE 7

Catfish were treated as in Example 2 except that the treating agents were dissolved to a 10 percent solids solution.

TABLE XIII

| | Example | | | |
|---|---|---|---|---|
| | A | B | C | D |
| | P.N. | | | |
| | SHMP/SAPP/SORB | 4,431,679 | Control | Sorbate |
| % Conc. | 10 | 10 | — | 115 |

Raw Appearance

| Day | | | | |
|---|---|---|---|---|
| 5 | 1 | 2 | 4 | 3 |
| 9 | 2 | 1 | 3 | 4 |

% Yield

| Day | | | | |
|---|---|---|---|---|
| 0 | 104.7 | 104.0 | 103.9 | 104.0 |
| 5 | 103.4 | 102.7 | 99.2 | 100 |
| 8 | 103.8 | 101.8 | 99.3 | 99.6 |

Standard Plate Count ($\times 10^3$)

| Day | | | | |
|---|---|---|---|---|
| 1 | 89 | 65 | 130 | 83 |
| 7 | 2,500 | 1,400 | 9,000 | 12,000 |
| 12 | 6,600 | 26,000 | 70,000 | 16,000 |

Taste Panel

| Day | Flv. | Tex. | Flv. | Tex. | Flv. | Tex. | Flv. | Tex. |
|---|---|---|---|---|---|---|---|---|
| 5 | 6.7 | 6.0 | 6.5 | 6.3 | 5.2 | 4.8 | 7.2 | 6.2 |
| 8 | 7.5 | 7.3 | 5.5 | 6.0 | 4.0 | 4.0 | 4.8 | 5.0 |

EXAMPLE 8

Cod were treated as in Example 7 using the agents set forth in TABLE XIV with the following results:

TABLE XIV

| | Example | | | | |
|---|---|---|---|---|---|
| | A SHMP/SAPP/SORB | B SHMP/SAPP | C FISH-PLUS TM | D Sorbate | E Control |
| % Conc. | 10 | 8.9 | 10 | 1.15 | 0 |

Raw Appearance Rank

| Day | | | | | |
|---|---|---|---|---|---|
| 7 | 1 | 2 | 4 | 3 | 3 |
| 13 | 1 | 1 | 3 | 4 | 2 |

% Yield

| Day | | | | | |
|---|---|---|---|---|---|
| 0 | 105.2 | 106.5 | 105.3 | 104.2 | 103.1 |
| 7 | 102.2 | 103.5 | 104.9 | 99.4 | 97.5 |
| 13 | 100.6 | 104.6 | 101.6 | 88.8 | 93.8 |

Standard Plate Count ($\times 10^3$)

| Day | | | | | |
|---|---|---|---|---|---|
| 2 | 15 | 190 | 540 | 630 | 150 |
| 6 | 45 | 26 | 36 | 51 | 36 |
| 10 | 31,000 | 3,900 | 78,00 | 10,000 | 46,000 |

Taste Panel

| Day | | | | | | |
|---|---|---|---|---|---|---|
| 7 | Flv. | 7.5 | 4.8 | 3.3 | 7.3 | 4.8 |
| | Tex. | 7.5 | 6.5 | 5.3 | 7.3 | 4.8 |
| 13 | Flv. | 6.3 | 3.8 | 5.8 | 2.3 | 3.8 |
| | Tex. | 7.0 | 6.3 | 5.5 | 2.8 | 5.0 |

EXAMPLE 9

Weighed freshly cut catfish fillets were flexed with 10 percent weight of fillets treatment solutions having 10 percent concentration of the ingredients listed in TABLE XIV at a commercial plant. The fillets were flexed for 1 minute in a rotating drum containing treatment solution, drained for 5 minutes and reweighed. Fourteen (14) sets of two treated fillets were placed on styrofoam trays and held on ice until sealed with clear wrap. The trays were stored on ice until separated into iced and refrigerated samples the next days.

Four sets, identified herein as Group I, of each treatment were stored refrigerated and tested for odor, appearance and standard plate count changes. Four sets were held at 2.8° C. (37° F.) and four were held on ice, these being identified as Group II. Weight changes, organoleptic and standard plate count evaluations were made. Three sets were frozen to study thaw drip loss and organoleptic changes after extended storage.

TABLE XV

| Example | Treatment | Percent Yield From Treatment[1] | After Storage[2] | pH[3] |
|---|---|---|---|---|
| A | SHMP/SAPP/SORB | 103.1 | 102.4 | 6.37 |
| B | FISH-PLUS TM | 103.7 | 103.5 | 6.60 |
| C | Control | 103.5 | 101.6 | 6.56 |

[1]Mean value of 14 values/treatment.
[2]Mean of 10 values/treatment - values were combined for storage up to 16 days.
[3]Mean of 2 values.

TABLE XVI

GROUP I
ORGANOLEPTIC EVALUATION OF REFRIGERATED CATFISH FILLETS

| Sample Marked | Odor | Appearance |
|---|---|---|
| | | Day 4 |
| A | None | Good, slight pink, fat white |
| B | Maybe a little off-flavor | Good, slight pink, fat white |
| C | None | Good, slight pink, fat white |
| | | Day 8 |
| A | None | Beginning to show yellow on one side of package |
| B | Slightly spoiled | Yellowing at fat and along muscle lines - yellower than A |
| C | Definitely spoiled | Pale, very slight yellowing |
| | | Day 12 |
| A | Slightly spoiled | Yellowing, very slight pink in the thickest part of the fillet |
| B | Spoiled | Yellowing, very slight pink in the thickest part of fillet |
| C | Putrid | Yellow, a tint of pink in center |

TABLE XVII

GROUP II
APPEARANCE OF PLANT TEST CATFISH

| Code | Treatment | Temp. °C. | Storage Time/Appearance Rank Day 4 | Day 6 | Day 8 | Day 12 |
|---|---|---|---|---|---|---|
| A | SHMP/SAPP/SORB | 0 | 1 | | 2 | 3 |
| | | 2.8 | 3 | 3 | 1 | |
| B | FISH-PLUS TM | 0 | 3 | | 1 | 2 |
| | | 2.8 | 1 | .1 | 3 | |
| C | Control | 0 | 2 | | 1 | 4 |
| | | 2.8 | 2 | 2 | 2 | |

TABLES XVIII AND XIX

MICROBIAL COUNTS OF PLANT TEST CATFISH

| Code | Treatment[1] | Standard Plate Counts ($\times 10^3$) Iced Storage Day 8 | Day 12 | Day 18 | Day 21 |
|---|---|---|---|---|---|
| A | SHMP/SAPP/SORB | 34 | 1,100 | 1,800 | 92,000 |
| B | FISH-PLUS TM | 20 | 1,300 | 2,400 | 11,000 |
| C | Control | 91 | 14,000 | 38,000 | 240,000 |

| | | | Standard Plate Counts ($\times 10^3$) Refrigerated Storage | | |
|---|---|---|---|---|---|
| Code | Treatment | Group | Day 4 | Day 6 | Day 8 | Day 12 |
| A | SHMP/SAPP/SORB | II | 5 | 6 | 290 | |
| | SORB | I | 8 | | 650 | 21,900 |
| B | FISH-PLUS TM | II | 54 | 20 | 2,400 | |
| | | I | 8 | | 8,800 | 20,000 |
| C | Control | II | 720 | 1,300 | 31,000 | |
| | | I | 206 | | 30,000 | 170,000 |

[1]Group II

TABLE XX

GROUP II
TASTE PANEL EVALUATION OF PLANT TEST CATFISH

| Code | Treatment | Parameter | Storage at °C. Day 4 | Day 8 | Day 12 | Day 18 |
|---|---|---|---|---|---|---|
| A | SHMP/SAPP/SORB | Flavor | 7.6 | 7.8 | 5.4 | 6.3 |
| | | Texture | 7.6 | 7.3 | 6.1 | 6.3 |
| B | FISH-PLUS TM | Flavor | 5.8 | 5.8 | 4.9 | 4.7 |
| | | Texture | 6.4 | 6.0 | 5.8 | 5.7 |
| C | Control | Flavor | 6.0 | 4.5 | 5.6 | —* |
| | | Texture | 5.0 | 5.0 | 5.8 | —* |

| Code | Treatment | Parameter | Storage at 2.8° C. Day 4 | Day 6 | Day 8 |
|---|---|---|---|---|---|
| A | SHMP/SAPP/SORB | Flavor | 7.0 | 7.0 | 6.2 |
| | | Texture | 7.2 | 7.3 | 5.4 |
| B | FISH-PLUS TM | Flavor | 7.2 | 5.5 | 5.0 |
| | | Texture | 7.0 | 6.3 | 6.0 |
| C | Control | Flavor | 5.3 | 6.3 | 6.0 |
| | | Texture | 5.5 | 5.8 | 5.2 |

*Inedible.

EXAMPLE 10

Cod were treated in the same manner as Example 8. The following results were obtained.

TABLE XXI

COD APPEARANCE, YIELD, MICROBIAL COUNTS AND FLAVOR

| | | Day 8 Appearance Rank | Raw Odor | % Yield Day 0 | Day 8 | Day 12 |
|---|---|---|---|---|---|---|
| Code | Treatment | | | | | |
| A | SHMP/SAPP/SORB | 1 | Neutral | 105.4 | 104.1 | 103.3 |
| B | SHMP/SAPP | 3 | Slt. Milk-jug | 107.1 | 102.7 | 99.3 |
| C | FISH-PLUS TM | 3 | Milk-jug | 108.2 | 108.0 | 104.9 |
| D | Sorbate | 5 | Slt. Spoiled, Yeasty, Fishy | 100.3 | 97.7 | 92.8 |
| E | Control | 4 | Slt. spoiled | 99.7 | 97.3 | 94.9 |

| | | Flavor Day 8 | | Standard Plate Count ($\times 10^{-3}$) Day | | |
|---|---|---|---|---|---|---|
| Code | Treatment | Flv | Tex | Day 1 | Day 6 | Day 12 |
| A | SHMP/SAPP/SORB | 5.7 | 5.3 | 120 | 1,600 | 7,400 |
| B | SHMP/SAPP | 4.0 | 4.0 | 350 | 2,400 | 51,000 |
| C | FISH-PLUS TM | 5.3 | 5.0 | 180 | 100 | 37,000 |
| D | Sorbate | —* | —* | 49 | 2,100 | 130,000 |
| E | Control | —* | —* | 170 | 2,600 | 77,000 |

*Inedible

EXAMPLE 11

Flounder fillets were cut from whole fish and treated as in Example 9 at a fish processor plant using the agents listed in TABLE XXII. The samples were tray packed and stored under refrigeration. They were evaluated for odor and appearance. The results are shown in TABLE XXII.

TABLE XXII

FLOUNDER APPEARANCE, ODOR, YIELD AND MICROBIAL COUNTS

| Code | Treatment | Appearance Rank[1] Day 5 | % Yield Day 0 | Day 5 |
|------|-----------|--------------------------|---------------|-------|
| A | SHMP/SAPP/SORB | 4 | 104.7 | 102.5 |
| B | FISH-PLUS TM | 1 | 105.2 | 104.1 |
| C | Water | 2 | 104.8 | 101.9 |

| Code | Treatment | Std. Plate Count ($\times 10^3$) Day 5 | Day 9 | Raw Odor Day 5 | Day 9 |
|------|-----------|-----|-----|-----|-----|
| A | SHMP/SAPP/SORB | 2,200 | 160,000 | Good | Slt. Yeasty |
| B | FISH-PLUS TM | 140,000 | 50,000 | Good | Slt. Yeasty |
| C | Water | 32,000 | 110,000 | Sour | Spoiled |

[1]Ranked in order where 1 is best appearance. Nine day appearance not acceptable for all samples - too dark.

As can be seen from these Examples, the compositions of the present invention use large amounts of sodium hexametaphosphate and small amounts of sorbate while achieving effective fish fillet stabilization. Expensive acids such as citric acid need not be used as required by the prior art. The composition of the invention provides effective bacterial, texture and appearance control at lower cost over that of the compositions of the prior art.

What is claimed is:

1. A composition for improving the shelf-life of fish fillet comprising:
   (a) from about 75 percent to about 90 percent alkali metal hexametaphosphate;
   (b) alkali metal acid pyrophosphate in an amount sufficient to provide a treatment solution having a pH within the range of from about 5.5 to about 6.5; and
   (c) a sorbate antimicrobial agent in a stabilizing effective amount;

said percentages being based on the total dry weight of said composition.

2. The composition of claim 1 wherein said alkali metal hexametaphosphate is sodium hexametaphosphate.

3. The composition of claim 1 wherein said alkali metal acid pyrophosphate is sodium acid pyrophosphate.

4. The composition of claim 1 wherein said antimicrobial agent is selected from the group consisting of sorbic acid and alkali metal sorbates.

5. The composition of claim 1 wherein said antimicrobial agent is an alkali metal sorbate.

6. The composition of claim 5 wherein said sorbate is potassium sorbate.

7. A fish fillet treating composition comprising from about 75 percent to about 90 percent sodium hexametaphosphate, from about 9 percent to about 11 percent sodium acid pyrophosphate and from about 4 percent to about 8.5 percent potassium sorbate, said sodium acid pyrophosphate being present in an amount sufficient to provide a treatment solution having a pH ranging from about 5.5 to about 6.5.

8. A method for treating fish fillet which comprises applying to the surface of the fillet an amount of the composition of claim 1 sufficient to improve the shelf-life of said fish fillet.

9. The method of claim 8 wherein said alkali metal hexametaphosphate is sodium hexametaphosphate.

10. The method of claim 8 wherein said alkali metal acid pyrophosphate is sodium acid pyrophosphate.

11. The method of claim 8 wherein said antimicrobial agent is selected from the group consisting of sorbic acid and alkali metal sorbates.

12. The method of claim 8 wherein said antimicrobial agent is an alkali metal sorbate.

13. The method of claim 12 wherein said sorbate is potassium sorbate.

* * * * *

UNITED STATES PATENT AND TRADEMARK OFFICE
CERTIFICATE OF CORRECTION

PATENT NO. : 4,670,277
DATED : June 2, 1987
INVENTOR(S) : Eugene Brotsky et al.

It is certified that error appears in the above-identified patent and that said Letters Patent are hereby corrected as shown below:

Col. 3, line 13, "5" should be --15--;

Col. 3, line 28, "preferably" should be "Preferably--;

Col. 4, line 26, "Example I" should be --Example 1--;

Col. 5, line 56, "lewels" should be --levels--;

Col. 8, line 29, "sample" should be --samples--;

Col. 8, line 50, delete "p" before "Example 4";

Col. 9, line 49, insert a period (.) after "12 days"--;

Col. 12, line 49, Table XIV, under "C", Day 10, "78,00" should be --7,800--;

Col. 11, line 61, "Example 2" should be --Example 6--.

Signed and Sealed this

Twenty-seventh Day of October, 1987

Attest:

DONALD J. QUIGG

Attesting Officer

Commissioner of Patents and Trademarks